(No Model.)

W. T. SMITH.
SAFETY SEAL FOR GAS TRAPS.

No. 338,112. Patented Mar. 16, 1886.

WITNESSES:
Chas. H. Luther Jr.
Jno. L. Condron

INVENTOR:
William T. Smith
by Joseph A. Miller & Co
Attys

United States Patent Office.

WILLIAM T. SMITH, OF PROVIDENCE, RHODE ISLAND.

SAFETY-SEAL FOR GAS-TRAPS.

SPECIFICATION forming part of Letters Patent No. 338,112, dated March 16, 1886.

Application filed March 27, 1885. Serial No. 160,186. (No model.)

*To all whom it may concern:*

Be it known that I, WILLIAM T. SMITH, of the city and county of Providence, and State of Rhode Island, have invented a new and useful Improvement in Safety-Seal Gas-Traps, of which the following is a full, clear, and exact description, reference being had to the accompanying drawings, forming a part of this specification.

My invention relates to attachments for automatically shutting off the flow of gas upon the occurrence of fire; and the object of my invention is to produce a simple device for this purpose which shall act promptly and reliably, and in which the closing of the gas-channel shall be performed solely by the action of a melting substance.

To the above purposes my invention consists in a trap-casing formed with an upper divided chamber to contain the solid solder, and a lower continuous chamber, through which the gas flows normally, and into which melted solder or any substance which melts at a low temperature runs in the event of a fire, as hereinafter described and claimed.

In order that my invention may be fully understood, I will proceed to describe it with reference to the accompanying drawings, in which—

Figure 1:
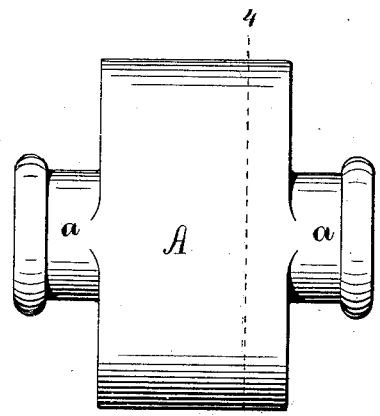
Figure 2:
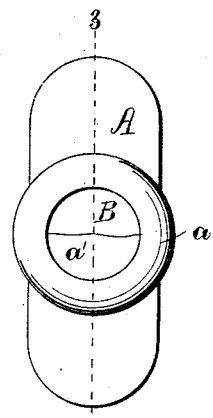
Figure 3:
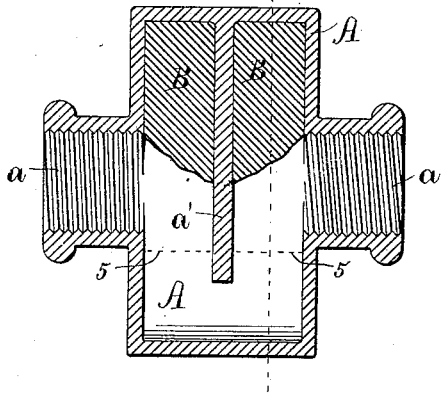
Figure 4:
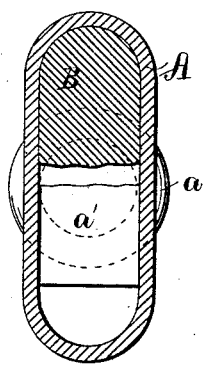

Figure 1 is a side elevation of my improved device. Fig. 2 is an end elevation of the same. Fig. 3 is a sectional view of the same on the line 3 3 of Fig. 2. Fig. 4 is a similar view of the same on the line 4 4 of Fig. 1.

In the said drawings, A designates a hollow casing, which may be of any suitable shape, but which is preferably of the shape illustrated in the drawings—that is to say, rectangular in side view and oval or elliptical in end view or cross-section. At the middle of each end of this casing is formed a threaded socket, $a$, for the pipe-connections, and within the casing is formed a partition, $a'$, which extends about two-thirds of the depth of the casing and transversely to the axes of the sockets $a$. This partition divides the interior of the casing into three chambers, two above the lower end of the partition and one below the lower end thereof.

B B designates the solder or substance which will melt at a low temperature, and which, when in a cold condition, lies within the two chambers at each side of the partition and above the sockets $a$. The gas enters at one socket and flows through the lower chamber, beneath the solder and the partition, and passes out of the casing through the opposite socket. Normally the casing is so placed that its partition extends downward, as shown in Figs. 3 and 4; but in filling with solder the casing is inverted in position, and melted solder is poured in through the sockets. After the solder has set the casing is placed in normal position. The casing and its partition are of metal, and when a fire occurs the heat will melt the solder and cause it to run down into the lower chamber and rise to the level indicated by the dotted line 5 5 in Fig. 3, thus cutting off the flow of gas. The solder alone serves to cut off the gas, so that all mechanical parts are dispensed with.

The device may be set in any convenient place, and may serve to cut off either directly at or behind the meter.

Tar, paraffine, or any other substance which will melt under a proper degree of heat may be substituted for the solder B in the upper chambers of the casing.

Having thus described my invention, I claim as new and desire to secure by Letters Patent—

1. A trap consisting of a casing which has a lower continuous chamber and a partial division-piece extending from the top of said casing into said chamber, and of fusible solder lying normally in the top of said casing, for the purpose described.

2. In a pipe, an enlargement partially divided by a vertical partition extending from the top of said enlargement, in which said top normally lies fusible solder, which, combined with said partition, closes and seals the pipe-channel, as described.

3. The combination, with the trap-casing A, provided with the division-piece $a'$ and sockets $a$, of the solder B, lying normally out of the gas-channel, for the purpose described.

WILLIAM T. SMITH.

Witnesses:
   J. A. MILLER, Jr.,
   M. F. BLIGH.